United States Patent
Kataoka et al.

(10) Patent No.: US 6,282,209 B1
(45) Date of Patent: Aug. 28, 2001

(54) METHOD OF AND SYSTEM CAPABLE OF PRECISELY CLIPPING A CONTINUOUS MEDIUM OBTAINED FROM A MULTIPLEXED BIT STREAM

(75) Inventors: Mitsuteru Kataoka, Fujisawa; Takenosuke Harada, Yokohama, both of (JP)

(73) Assignees: Matsushita Electric Industrial Co., Ltd., Osaka; Information Broadcasting Laboratories, Inc., Tokyo, both of (JP)

( * ) Notice: Subject to any disclaimer, the term of this patent is extended or adjusted under 35 U.S.C. 154(b) by 0 days.

(21) Appl. No.: 09/257,204

(22) Filed: Feb. 25, 1999

(30) Foreign Application Priority Data

Mar. 2, 1998 (JP) .................................................. 10-063898
Jun. 30, 1998 (JP) .................................................. 10-198076

(51) Int. Cl.[7] ........................................................ H04J 3/00
(52) U.S. Cl. ........................................... 370/498; 370/389
(58) Field of Search ................................... 370/498, 389, 370/442, 468, 469, 470, 466, 467, 487, 486, 493, 496, 503, 509, 522, 538, 540, 512, 336, 337, 347; 348/385.1; 375/240

(56) References Cited

U.S. PATENT DOCUMENTS

| | | | | |
|---|---|---|---|---|
| 5,742,623 | * | 4/1998 | Nuber et al. | 714/798 |
| 5,838,678 | * | 11/1998 | Davis et al. | 370/389 |
| 5,917,830 | * | 6/1999 | Chen et al. | 370/487 |
| 5,956,088 | * | 9/1999 | Shen et al. | 348/385 |
| 6,009,236 | * | 12/1999 | Mishima et al. | 386/111 |
| 6,115,537 | * | 9/2000 | Yamada et al. | 386/109 |
| 6,137,834 | * | 10/2000 | Wine et al. | 375/240 |

\* cited by examiner

*Primary Examiner*—Douglas Olms
*Assistant Examiner*—Brian Nguyen
(74) *Attorney, Agent, or Firm*—Lowe Hauptman Gilman & Berner, LLP

(57) ABSTRACT

A system of clipping a specified segment from a continuous medium with a raised precision in a terminal served be a digital broadcasting system. A plurality of continuous media is broadcast as a multiplexed stream, preferably as a transport stream of MPEG-2 standard. In the receiving terminal, a reference time (t) is generated. The start and end times Ts and Te of a specified segment of a specified medium are expressed in the reference time. The specified medium is downloaded during a period including the start time Ts and the end time Te to obtain a first portion of the continuous medium. Then, a second portion is clipped from the first portion such that the second portion starts with a data unit that has been received after the start time Ts and has a first header including a first minimum index and ends just before a data unit that has been received after the end time Te and has a second header including a second minimum index. In MPEG system, PTS (Presentation Time Stamp) or DTS (Decoding Time Stamp) is preferably used for the index. In this case, the start and end times are used in the same unit as PTS.

34 Claims, 16 Drawing Sheets

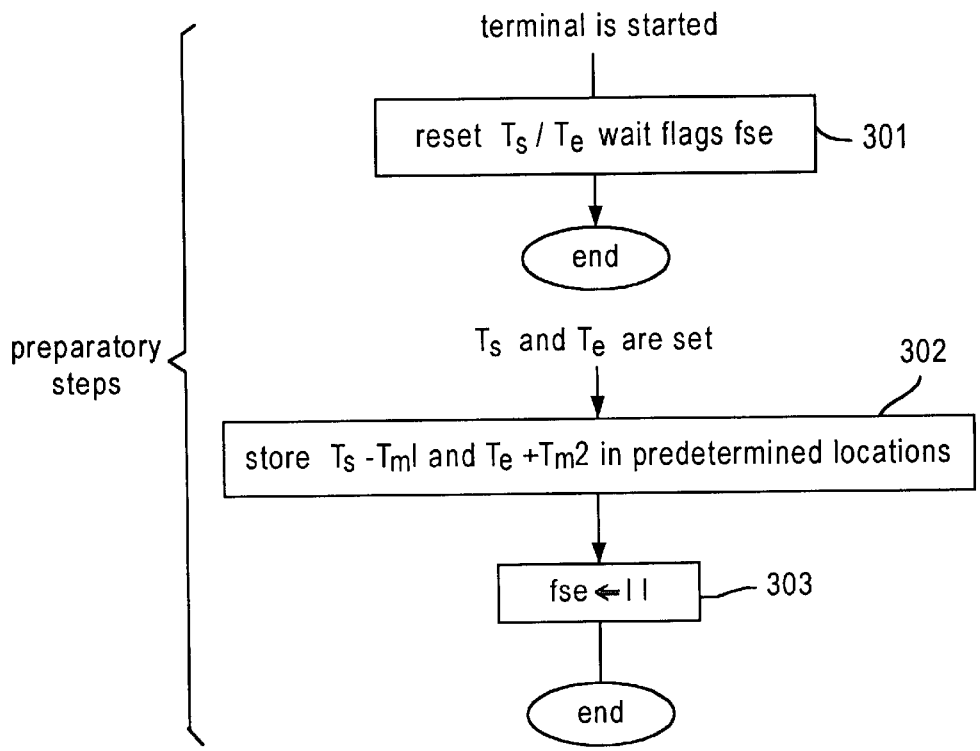
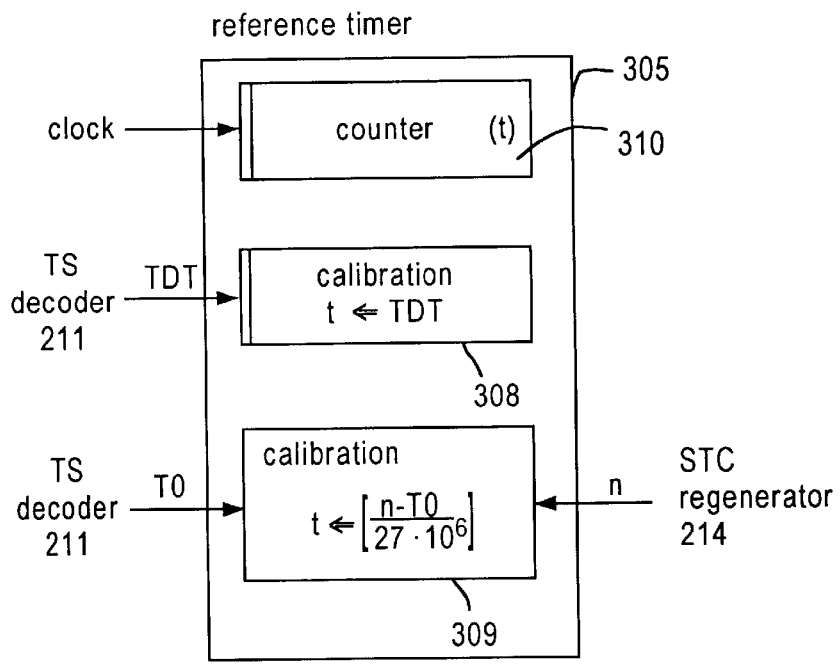
[X] means that X is in the UTC (Universal Time Co-ordinated) form.

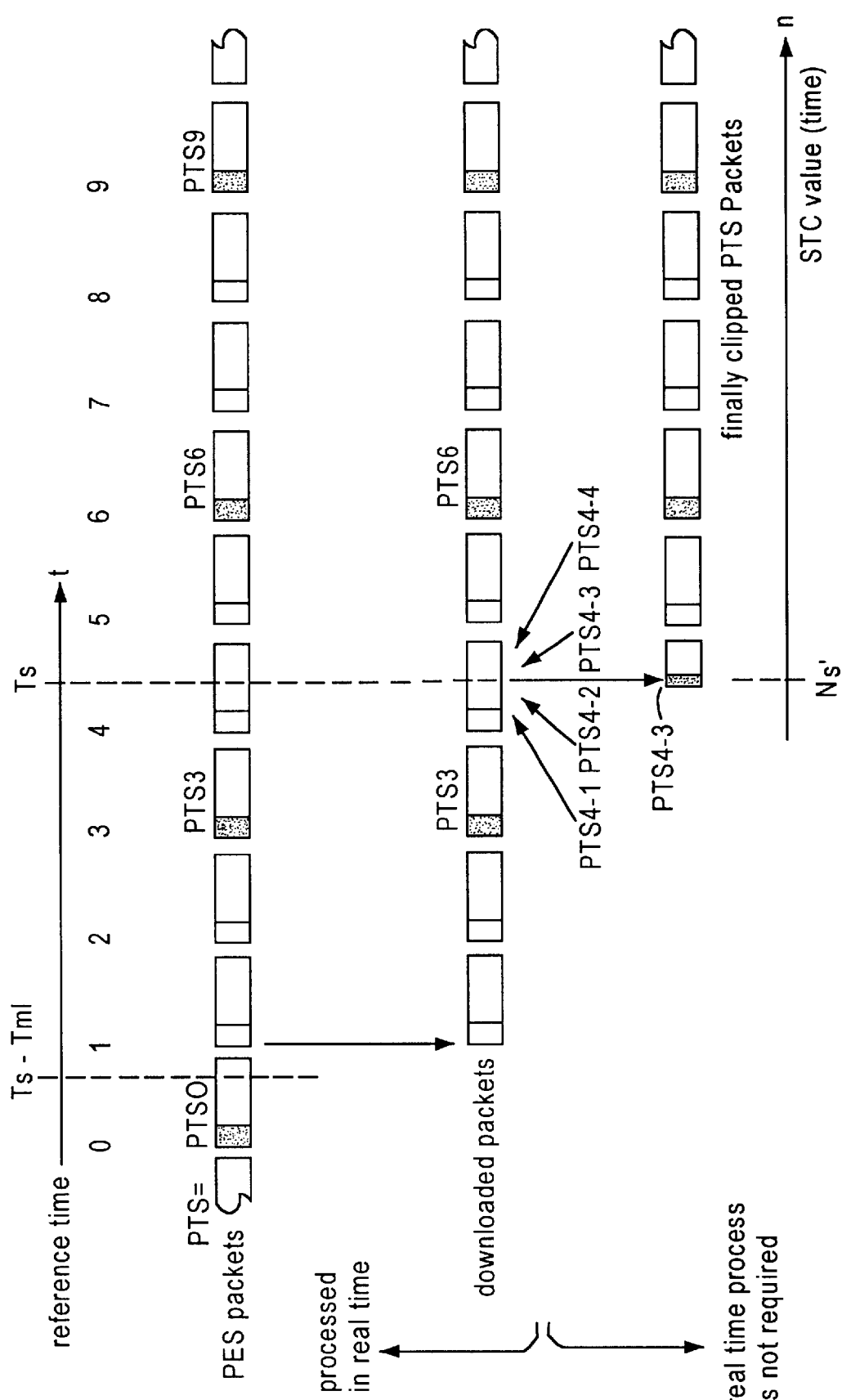

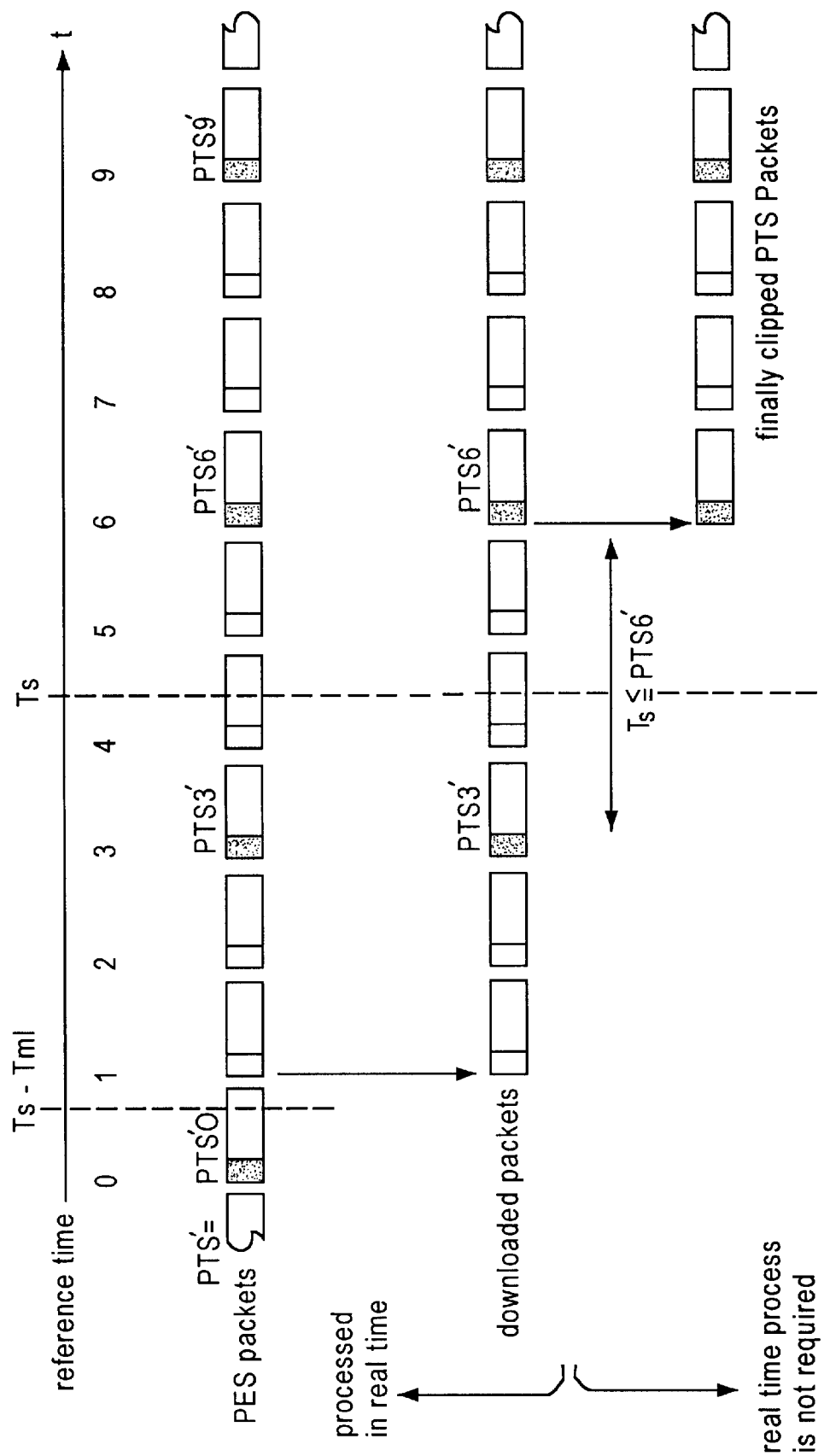

METHOD OF AND SYSTEM CAPABLE OF PRECISELY CLIPPING A CONTINUOUS MEDIUM OBTAINED FROM A MULTIPLEXED BIT STREAM

BACKGROUND OF THE INVENTION

1. Field of the Invention

The invention generally relates to a digital broadcasting system in which a plurality of channels are transmitted as a time-division multiplexed data stream, each channel comprising a plurality of continuous or time-series multimedia programs. It relates more particularly to a method of and a system for downloading a segment or the whole of a received continuous program from the data stream with a raised preciseness in such a digital broadcasting system.

2. Description of the Prior Art

Overview of a Conventional Multiplexing Technique

FIG. 1 is a schematic block diagram showing an exemplary arrangement of a conventional digital broadcasting system 1 to which the present invention is applicable. In FIG. 1, the broadcasting system 1 comprises at least one broadcasting station 2, a transmission medium 3 and a multiplicity of receiving terminals 4.

In a multimedia digital broadcasting system, a video, one or more audio and various data constitute a program. A plurality of such programs for respective channels is multiplexed into a data stream. Coding and multiplexing in most cases is achieved according to a international standard for high efficiency coding and multiplexing, known as MPEG-2 (Motion Picture Experts Group II) (ISO/IEC 13818). For this, the following description will be given in connection with the MPEG-2 standard.

In an MPEG encoder unit 201 of the broadcasting station 2, a video is coded into a video MPEG-coded bit stream, which is then packetised into video PES (packetised elementary stream) packets (according to ISO/IEC 13818-2). An audio is separately coded into an audio MPEG-coded bit stream, which is packetised into audio PES packets (according to ISO/IEC 13818-3). FIG. 2 is a diagram showing a structure of a PES packet 900, wherein a sectioned strip bounded by broken lines fanning out downward form a bold-lined section shows a detailed structure of the bold-lined section and wherein a numeral under each field indicates the length of the field in bits. The PES packets 900 are variable length packets, which are used to synchronize the coded bit streams for a program. Each PES packet 900 comprises a header 901 and PES packet data bytes 902.

The video and audio PES's (or PES packet streams) that constitute a program are multiplexed into a transport stream (TS), which comprises TS packets shown in FIG. 3. FIG. 3 is a diagram showing a structure of a TS packet 910, wherein a sectioned strip bounded by broken lines fanning out downward form a bold-lined section shows a detailed structure of the bold-lined section. In FIG. 3, a TS packet 910 is fixed, i.e., 188 bytes in length and comprises a header 911 and a payload 912. The header 911 contains information on the contents of the payload 912, including a 13-bit packet ID (PID) 913 for identifying the contents of the payload 912.

The multiplexing of the PES packet streams is achieved by dividing and storing each of the PES packets 900 into and in one payload 912 after another of the TS under creation. In this case, the values of the PIDs 913 in the headers 911 of the TS packets 910 are so set that the value of each PID 913 is associated with the PES packet stream a part of which is contained in the corresponding payload 912. Thus, continuous (or time-series) media materials that constitute a multimedia program are multiplexed into a TS. A plurality of such TSs corresponding to respective channels is further multiplexed into another TS. The operations described so far are executed in the MPEG encoder unit 201. In order to discriminate the first created TSs from the finally created TS, the former and the latter are referred to as "logical channel TS (LC TS)" and "physical channel TS (PC TS)", respectively.

The physical channel TS is transmitted by a transmitter 202 into a transmission medium 3.

On the other hand, a receiving terminal 4 comprises a tuner 210 for receiving a plurality of physical channel TSs and providing a selected physical channel TS, which has been multiplexed in accordance with the MPEG-2 standard; a TS decoder 211 for providing a selected logical channel TS from the received PC TS; a PES decoder 212 for extracting the PES packets 900 from the payloads 912 of the TS packets from the TS decoder 211 and demultiplexing the PES packets 900 into video and audio PES packet streams according to the PIDs 914 in the TS packet headers 911; and a presentation decoder 213 for restoring video and audio bit streams from the video and audio PES packet streams by MPEG decoding the video and audio PES packet streams separately. The tuner 210, the TS decoder 211, the PES decoder 212 and the presentation decoder 213 may be any suitable conventional ones. However, it is noted that the MPEG decoding has to be achieved such that the decoded video and audio bit streams synchronize with each other.

For this purpose, the digital broadcasting system 1 is arranged as follows.

Synchronization Technique

The broadcasting station 2 has a system time clock (STC) generator 203. The generated STC is a 42-bit number n that is incremented at a frequency of 27 MHz. The STC n is contained in a program clock reference (PCR) field 914 in the header 911 of each TS packet 910. Also, the broadcasting station 2 is permitted to store a presentation time stamp (PTS) and/or a decode time stamp (DTS) in a PTS 903 and DTS 904 fields in a optional header portion 905 of a PES packet 900 if the PES packet 900 contains the head of an access unit of an MPEG-coded bit steam in its packet data bytes field 902 (An access unit is one frame in case of video bit stream and one audio frame in case of audio bit stream). The PTS and DTS are represented by 33 bits with a precision of 90 KHz. Thus, the receiving terminal 4 can synchronize a plurality of continuous media materials with each other by decoding and presenting the continuous media materials such that the PTSs of the media materials coincide with a corresponding regenerated STC from a STC regenerator 214. The STC regenerator 214 is a PLL(phase locked loop)-based circuit that provides a regenerated 42-bit STC value n at a frequency of 27 MHz according to the values of the PCR fields 914 of the headers 911 of the TS packets 910 supplied from the TS decoder 211 while keeping the error with respect to the PCR 914 value within a certain range. It is noted that the TS decoder 211 is configured to ensure a high precision of the delay time from input of a TS packet 910 from the tuner 210 to extraction of an STC from the PCR field 914 of the TS packet 910.

However, since the STC is a clock specific to the broadcasting system 1 and different from ordinary time we use in our daily life, the STC is inconvenient for us to use in operating and programming the receiving terminal 4. For this, a clock that provides ordinary time is required.

As such a clock, EIT (Event Information Table) and TDT (Time and Date Table) are available which are prescribed in a DVB-SI (Digital video broadcasting—Service Information) standard (ETS 300 468) established by a standardization organization ETS (European Telecommunication Standard). The EIT contains the start and the duration of each event or program. The TDT is a time in which year (y), month (mo), date (d), hour (h), minute (m) and second (s) are expressed in a form known as UTC (Universal Time Co-ordinated) form. The TDT is used for reference to an event or program. (The time according to the TDT is referred to as "reference time"). In Japan, Japanese Standard Time is used as the reference time. The reference time is used in, e.g., displaying a program guide according to EPG (electronic program guide) and programming a VTR (video tape recorder). The broadcasting station 2 preferably has a TDT receiver 204 for receiving the TDT data. The broadcasting station 2 transmits TDT data in the well-known section format.

In order to enable a conversion between a regenerated STC and a corresponding reference time, the broadcasting station 2 also transmits a reference STC value (denoted by N0), which is again expressed by 42 bits and variable by a step of 1/27MHz. A value of STC at 0:00 am in reference time is preferably used as the reference STC value. The reference STC value is transmitted in a format known as "section" defined in the above-mentioned DVB-SI standard. The reference STC value may be divided into subtables called sections in transmission. It is noted that the section format is intended for repeated transmission of same information and is not guaranteed for synchronization or constant delay.

Conventional Downloading Techniques

FIG. 4 is a diagram showing one conventional technique for clipping a desired portion of a received TS. It is assumed that a desired portion of the received TS is specified by the start time Ts and the end time Te of the desired portion (Ts and Te is expressed in the above-mentioned reference time) and that the start and end times are given by a user directly specifying them or by the broadcasting station transmitting event information (e.g., EPG, EIT, etc.) including the channel ID, the segment ID, Ts and Te of a time segment of a channel and the user selecting a desired time segment. In this technique, The received TS is clipped at the given start and end times Ts and Te measured by a local timer provided in a receiving terminal.

However, the conventional technique provides only a lower clipping precision due to a significant error between the scheduled time and the actually transmitted time which error is affected by buffering in the transmitter 202 and the receiving terminal 4, a transmission delay in the transmission media 3, and the error between the timers of the broadcasting station 2 and the receiving terminals 4.

FIG. 5 is a flowchart showing an operation executed by the controller 215 in another downloading technique. In FIG. 5, the start and end reference times Ts and Te is obtained in a manner described in the above technique in step 251. In order to enable the clip range to be specified with a higher precision, it is assumed that each of the times Ts and Te can be expressed in a combination of a reference time (whose unit is a second) and the number f of frames ($0 \leq f \leq 29$). Specifically, let a reference time t (e.g., Ts or Te) be expressed in the form of "y:mo:d:h:m:s:f". In step 252, the start and end reference times Ts and Te are converted into 42-bit STC values Ns and Ne by using the above-mentioned 42-bit reference STC value N0 in a manner like:

$$n=[N0+(27\times10^6/F)\times\{(60\times(60h+m)+s)\times F+f\}] \bmod (2^{42}),$$

where n is an STC value which corresponds to a reference time t, F is the number of frames per second, and XmodY is the residue of X/Y. In step 253, the STC values Ns and Ne is further converted into 33-bit STC values Ns' and Ne' so as to be compared with presentation time stamps (PTSs) which are also 33 bits in length. The method of this conversion is detailed in the MPEG-2 standard. FIG. 6 is a diagram showing how a clipping is started for PES packets P0, P1, . . . , wherein a small rectangle at the head of each packet Pi indicates the header 901 thereof, and blacked ones among the small rectangles indicate headers 901 with values in their PTS fields 903. In step 254, a test is made to see if the PTS 903 value of the current PES packet Pi (i=0, 1, . . . ) is equal to or larger than the 33-bit start STC value Ns'. The test of step 254 is repeated till the test result becomes YES. If the test result is YES in step 254, clipping is started with this PES packet Pi (a packet P6 in FIG. 6 for example). In step 256, another test is made to see if the PTS 903 value of the current PES packet Pj (j is an integer larger than i) is equal to or larger than the 33-bit end STC value Ne'. The test of step 256 is repeated till the test result becomes YES. If the test result is YES in step 256, clipping is stopped immediately. The operation of steps 254 through 257 is executed for both of the video and audio PES packet streams. In this way, a desired portion is clipped from the received continuous media.

However, this technique has to execute, in real time, the steps 254 through 257 which involve a comparison with the value of the PTS field of each PES packet, which may require hardware dedicated to such steps. If such hardware is not provided, the controller 215 has to monitor every PTS field even when either end of a clipped portion is not supposed to appear, causing the total load of the terminal 4 to increase. This results in an increase in the power consumption during the stand-by.

It is therefore an object of the invention to provide a method of downloading a desired portion of a received continuous medium with a raised precision without increasing the load in processing, and to provide a broadcasting system capable of such downloading.

SUMMARY OF THE INVENTION

Broadly according to one aspect of the invention, in a digital broadcasting system there is provided a method of clipping a specified segment from a continuous medium with a raised precision. A broadcasting station transmits a plurality of continuous media as a multiplexed stream. Each continuous medium is structured to form a plurality of layers of data units including a layer of packets. Each packet includes frames as data units of a lower layer. The broadcasting station inserts an index in each header of selected packets. An index indicates a time to be decoded or presented.

Each terminal in the digital broadcasting system causes a reference timer to generate a reference time (t). The terminal obtains a start time (Ts) and an end time (Te) of the segment. The start and end times Ts and Te are expressed in the reference time. The terminal downloads the continuous medium during a period including the start time Ts and the end time Te to obtain a first portion of the continuous medium. Then, the terminal clips a second portion from the first portion such that the second portion starts with a data unit that has been received after the start time Ts and has a first header including a first minimum index and ends just before a data unit that has been received after the end time Te and has a second header including a second minimum index.

In MPEG system, PTS (Presentation Time Stamp) or (Decoding Time Stamp) is preferably used for the index. In this case, the start and end times are converted into time in the same unit as PTS.

In an embodiment, the first portion is preferably downloaded from the continuous medium during a period from an advanced start time Ts−Tm1 to a delayed end time Te+Tm2, where Tm1 and Tm2 are margins of an order of seconds.

The reference timer is preferably calibrated by using information transmitted from the transmitter, i.e., TDT (Time and Date Table), and the reference time is used in downloading.

In one embodiment, the transmitter may generate a second reference time from a standard time and expresses the indexes in the second reference time. The second portion may be clipped such that the second portion starts with a packet with a first header including a first earliest index later than the start time Ts and ends just before a packet with a second header including a second earliest index later than the end time Te. In this case, the reference timer is preferably calibrated by using information transmitted from said transmitter.

In one embodiment, the calibration of the reference timer preferable includes generating a counter value (n) in accordance with count values synchronously inserted in the multiplexed stream; obtaining a reference count value (N0) for use in conversion between the counter value n and the reference time t; and calibrating the reference timer by using the counter value n and the reference count value N0.

Alternatively, the first mentioned method may further includes the steps of: the transmitter generating first counter values; synchronously inserting the first counter values in the multiplexed stream; and using the first counter values for the indexes. The clipping comprises the steps of: generating a second counter value (n) in accordance with the first counter values extracted from the multiplexed stream; obtaining from the multiplexed stream a reference counter value for use in conversion between the second counter value n and the reference time t; converting the start time Ts and the end time Te into a start counter value (Ns) and an end counter value (Ne) expressed in a same unit as the second counter value n by using the reference counter value; and clipping the second portion such that the second portion starts with a first packet with a first header including a first minimum index larger than the start counter value Ns and ends just before a second packet with a second header including a second minimum index larger than the end counter value.

In one embodiment, the first mentioned method may further include the steps of: the transmitter generating first counter values; synchronously inserting the first counter values in the multiplexed stream; and using, for each of the indexes, a precision-reduced version of one of the first counter values. The clipping preferably comprises the steps of: generating a second counter value (n) in accordance with the first counter values extracted from the multiplexed stream; obtaining from the multiplexed stream a reference counter value for use in conversion between the second counter value n and the reference time t; converting the start time Ts and the end time Te into a start counter value (Ns) and an end counter value (Ne) expressed in a same unit as the second counter value n by using the reference counter value; converting the start counter value Ns and the end counter value Ne into a start value (Ns') and an end value (Ne') of a same precision as the indexes; and clipping the second portion such that the second portion starts with a first packet with a first header including a first minimum index larger than the start value Ns' and ends just before a second packet with a second header including a second minimum index larger than the end value Ne'.

The method may further include the steps of the transmitter conforming the multiplexed stream to a TS (Transport Stream) defined in the MPEG-2 (Moving Picture Experts Group) standard by inserting the first counter values in CPR (Program Clock Reference) fields and by using the indexes for PTS (Presentation Time Stamp) fields and DTS (Decoding Time Stamp) fields of the headers of the packets to make the packets PES (Packetized Elementary Stream) packets; and the terminal utilizing one of the PTS and DTS as the indexes.

According to another aspect of the invention, there is provided broadcasting equipment for use in a digital broadcasting system serving a plurality of receiving terminals. The broadcasting equipment comprises MPEG encoding means for preparing a plurality of continuous media each comprising packets such that packets of video media among the continuous media are configured to consist of at least one I group, where each I group including only one I picture and P and B pictures such that all of the P and B pictures can be decoded without referring to a picture of any other groups; and multiplexing means for transmitting an MPEG bit stream into which the continuous media have been multiplexed, so that each of the terminals can clip a specified segment from any of the continuous media with a precision by the packet.

According to another aspect of the invention, there is provided a system capable of not only utilizing a plurality of continuous media transmitted as a multiplexed stream from a digital broadcasting station but also clipping a specified segment from any of the continuous media with a raised precision. Each continuous medium is structured to form a plurality of layers of data units including a layer of packets. Each packet includes frames as data units of a lower layer. An index is inserted in each header of selected packets of the packets, The system comprises a reference timer for generating a reference time (t) and a controller. The controller comprises segment specifying means for obtaining a start time (Ts) and an end time (Te) of the segment, the start time Ts and the end time Te being expressed in the reference time; rough downloading means for downloading the continuous medium during a period including the start time Ts and the end time Te to obtain a first portion of the continuous medium; and precisely trimming means for clipping a second portion from the first portion such that the second portion starts with a data unit that has been received after the start time Ts and has a first header including a first minimum index and ends just before a data unit that has been received after the end time Te and has a second header including a second minimum index.

BRIEF DESCRIPTION OF THE DRAWING

The features and advantages of the present invention will be apparent from the following description of an exemplary embodiment of the invention and the accompanying drawing, in which:

FIG. 6 is a diagram showing how a clipping is started;

FIG. 7 is a flowchart showing an exemplary preparatory steps executed before a rough downloading operation by the controller 215 in accordance with the principles of the invention;

FIG. 8 is a diagram showing an exemplary arrangement of a preferred embodiment of a reference timer according to the principles of the invention;

FIG. 18 is a diagram for describing an operation executed for the neighborhood of the beginning of a downloaded portion in the third illustrative embodiment of the invention; and FIG. 19 is a diagram showing an exemplary operation of obtaining a clip from a PES packet stream including reference time-based time stamp in accordance with the principles of the invention.

Throughout the drawing, the same elements when shown in more than one figure are designated by the same reference numerals.

DETAILED DESCRIPTION OF THE PREFERRED EMBODIMENTS

Embodiment I

FIG. 7 is a flowchart showing an exemplary preparatory steps executed before a rough downloading operation by the controller 215 in accordance with the principles of the invention. In FIG. 7, if the receiving terminal 4 is started, then the controller 215 resets Ts/Te wait flags fse that indicate whether the reference time t has reached the start and/or end reference time in step 301. If the controller 215 obtains start and end reference times Ts and Te for downloading in a conventional manner as described above, then, the controller 215 stores the start and end times Ts and Te with respective predetermined margins Tm1 and Tm2 set, i.e., Ts−Tm1 and Te+Tm2 in predetermined locations in step 302. Tm1 and Tm2 are of the order of seconds. Doing this ensures that the desired segments of the PES packet streams are included in the downloaded portions. It is noted that the margins Tm1 and Tm2 may be identical to each other.

Then, the controller 215 sets the flags fse to, say, logical 11 in step 303 and waits till the start time Ts. In this case, a reference timer for providing a local version of the above-mentioned reference time is used.

Figure 1:
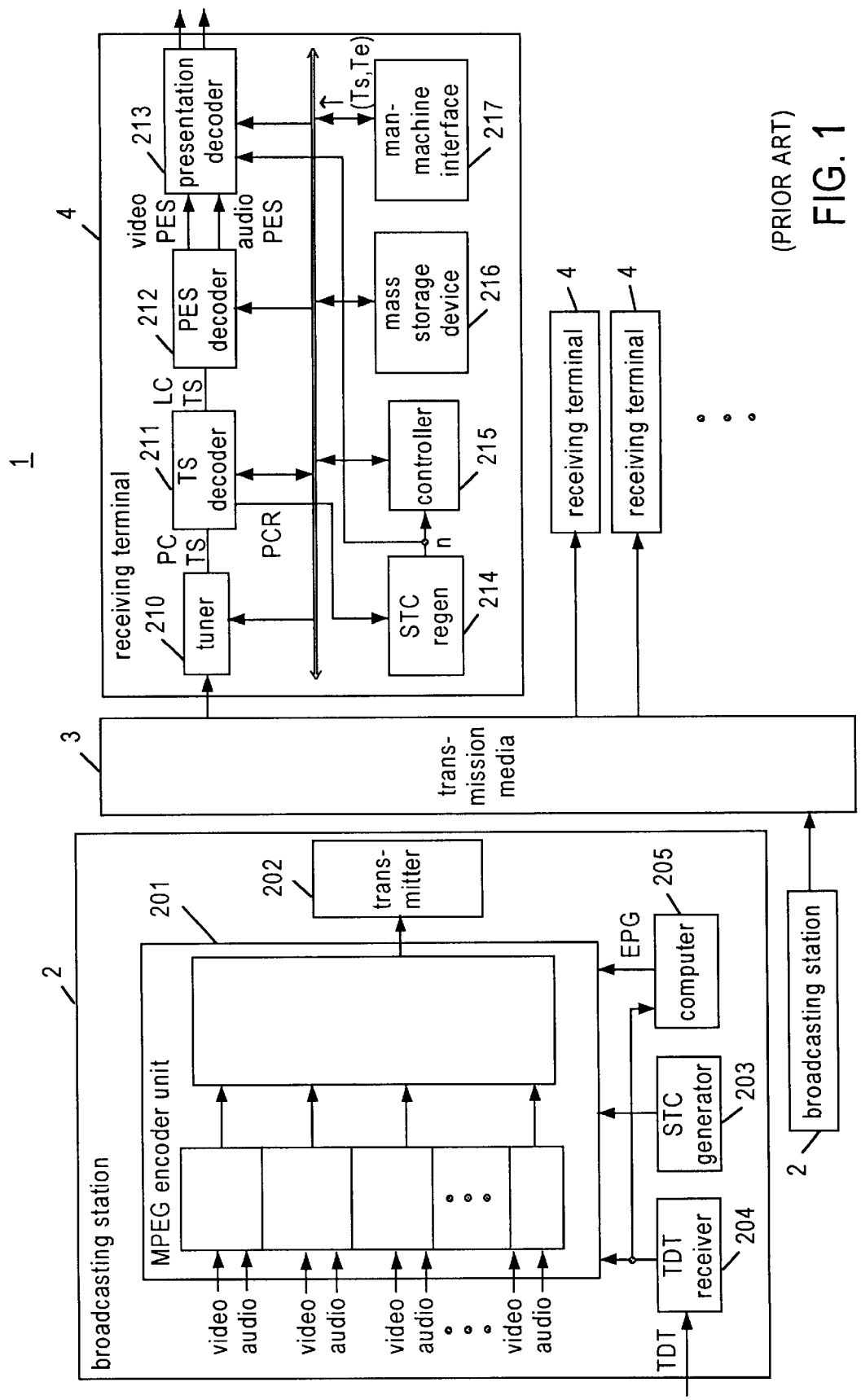
FIG. 1 is a schematic block diagram showing an exemplary arrangement of a conventional digital broadcasting system to which the present invention is applicable.

FIG. 8 is a diagram showing an exemplary arrangement of a preferred embodiment of a reference timer 305 according to the principles of the invention. It is noted that the reference timer may be realized in hardware and/or in software. Since FIG. 1 assumes a software implementation of the timer 305, the reference timer 305 is assumed to be a set of interrupt subroutines that constitute a complete timer function. The timer 305 is basically a preset counter 310. The value (t) of the counter 310 is preset by the controller 215 and thereafter incremented in response to an appropriate clock supplied by a not-shown clock circuit. Preferably, the reference timer 305 further comprises calibration subroutines 308 and 309. The subroutine 308 is invoked in response to a reception of TDT from the TS decoder 211 to set the counter value t for TDT. Using only TDT will not necessarily yield a precision over an order of a second depending on the delay that varies by terminals 4 and on the frequency of TDT transmissions. This is because the TDT is transmitted in the section format from which no guarantee is obtained against a delay with respect to the STC value. For this, the calibration subroutine 309 is preferably provided. In response to a reception of the reference STC value N0 from the TS decoder 211, the subroutine 309 is invoked. Then, the subroutine 309 reads the current STC value N from the STC regenerator 214 while storing the current reference time T; converts the read STC value N into a corresponding reference time t according to the equation:

$$T = \left\| \frac{N - T0}{27 \times 10^6} \right\|,$$

where $\|X\|$ indicates that X is express in the above-mentioned UTC from; and sets the value t of the counter 311 for $$\left\| \frac{N - T0}{27 \times 10^6} + \alpha \right\|$$

at a reference time of T+α, where α is a time period sufficiently longer than required for the conversion and subsequent setting of the counter 310. Doing this causes the reference timer 305 to provide accurate reference time. However, the calibrators 312 and 313 are optional.

Figure 9:
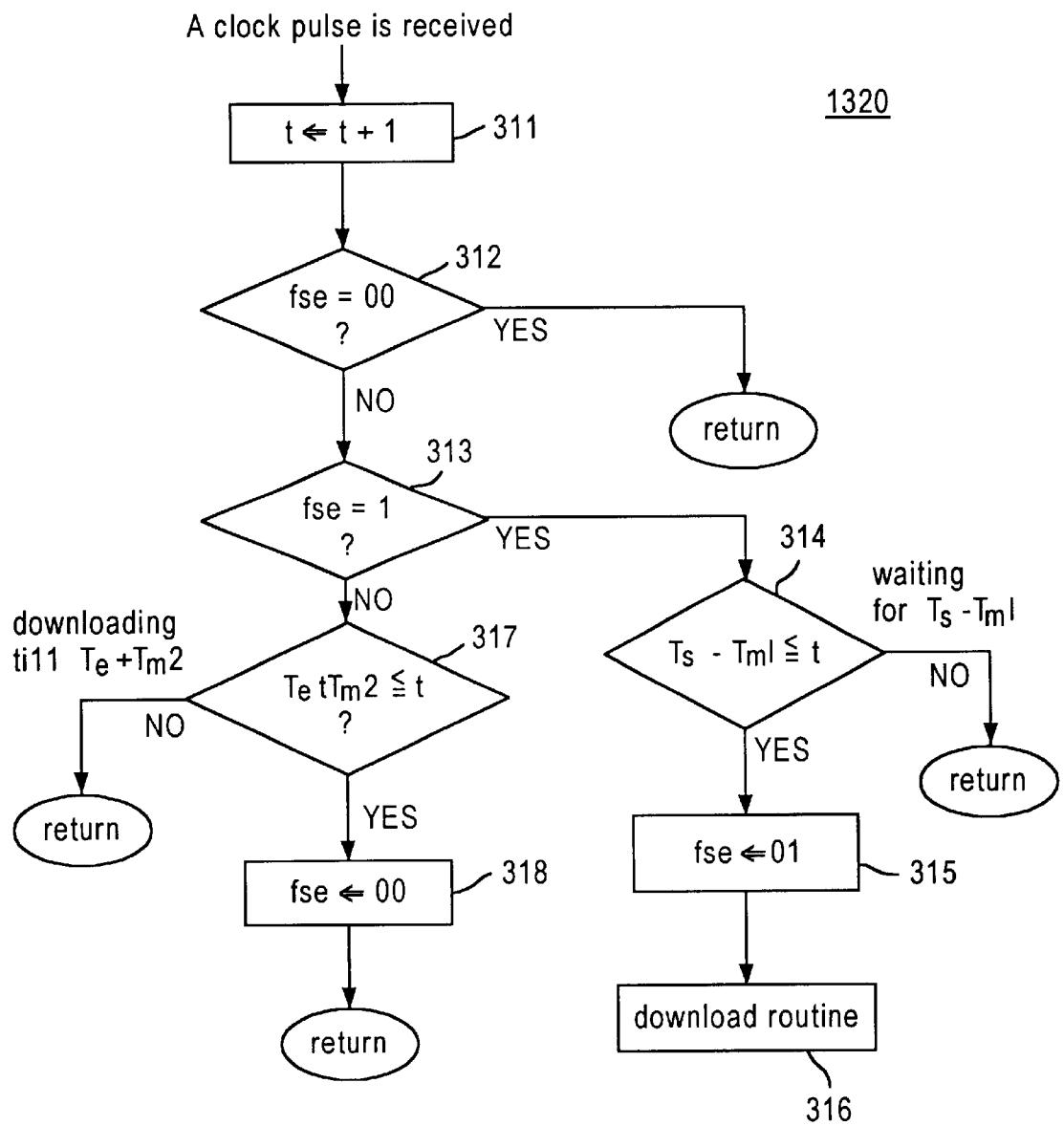
FIG. 9 is a flowchart showing an exemplary operation of the count subroutine 320.

It is preferable to make a decision of whether the reference time t has reached either cutting time Ts−Tm or Te+Tm in a clock-driven count subroutine of the counter 310. FIG 9 is a flowchart showing an exemplary operation of the count subroutine 320. In response to a reception of a clock, an interrupt is issued to cause the subroutine 320 is called. Then, the counter value t is incremented in step 311. In step 312, the Ts/Te flags fse are tested to see if the flags fse are all zero. If so, the control is returned to the original routine. Otherwise, a test is made in step 313 to see if the flags fse are logical 11. If so, a test is made in step 314 to see if the reference time t has reached or passed the advanced start time Ts−Tm1. If not, the control is returned to the original routine. If the test result is YES in step 314, then the flags fse are set to, e.g., logical 01 in step 315 and the control is passed to a download routine 316 (detailed later). If the test result is NO in step 313, then a test is made in step 317 to see if the reference time t has reached or passed the delayed end time Ts–Tm1. If not, meaning that the controller 215 is downloading the PES packets, then the control is returned to the original routine, i.e., the download routine 316 in this case. If the test result is YES in step 317, meaning the end of downloading, then the flags fse are set to logical 00 in step 318 and the control is returned again to the download routine 316.

Figure 10:
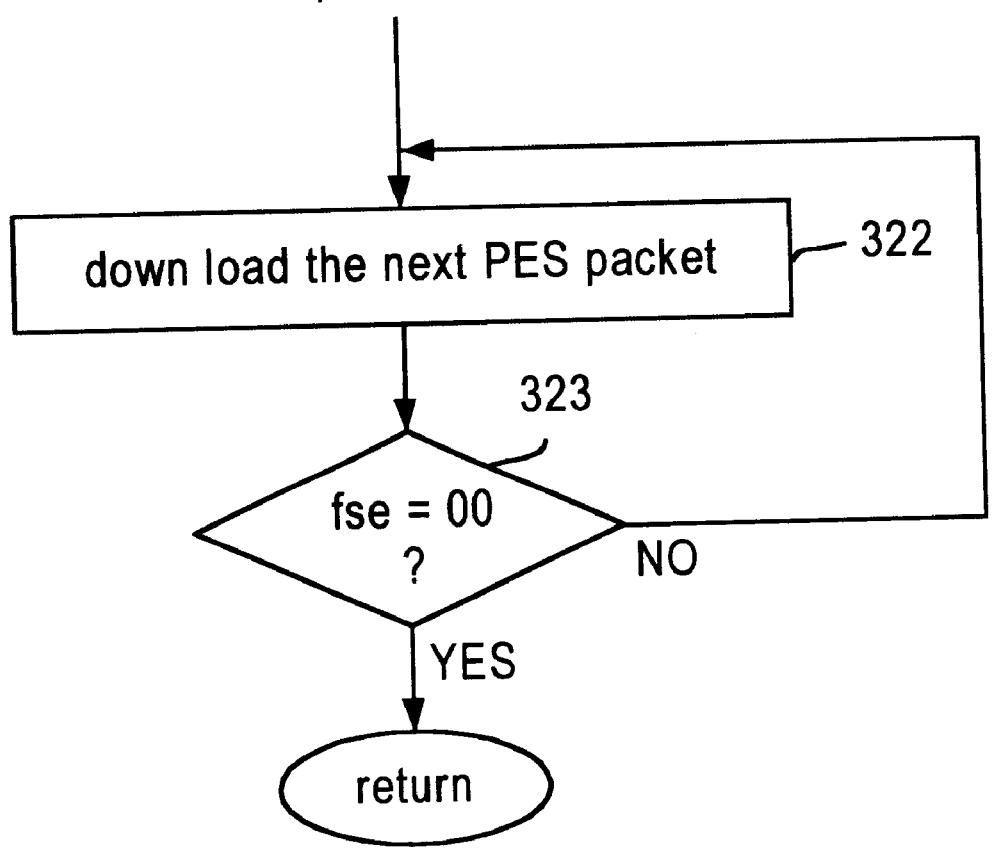
FIG. 10 is a flowchart showing the details of the download routine 316.

FIG. 10 is a flowchart showing the details of the download routine 316. After step 315 of FIG. 9, the controller 215 downloads the next PES packet in the mass storage device 216 in step 322 and makes a test to see if the flags are logical 00 in step 322. The step 322 is repeated till the flags become logical 00, when the control is returned to the original routine.

Figure 2:
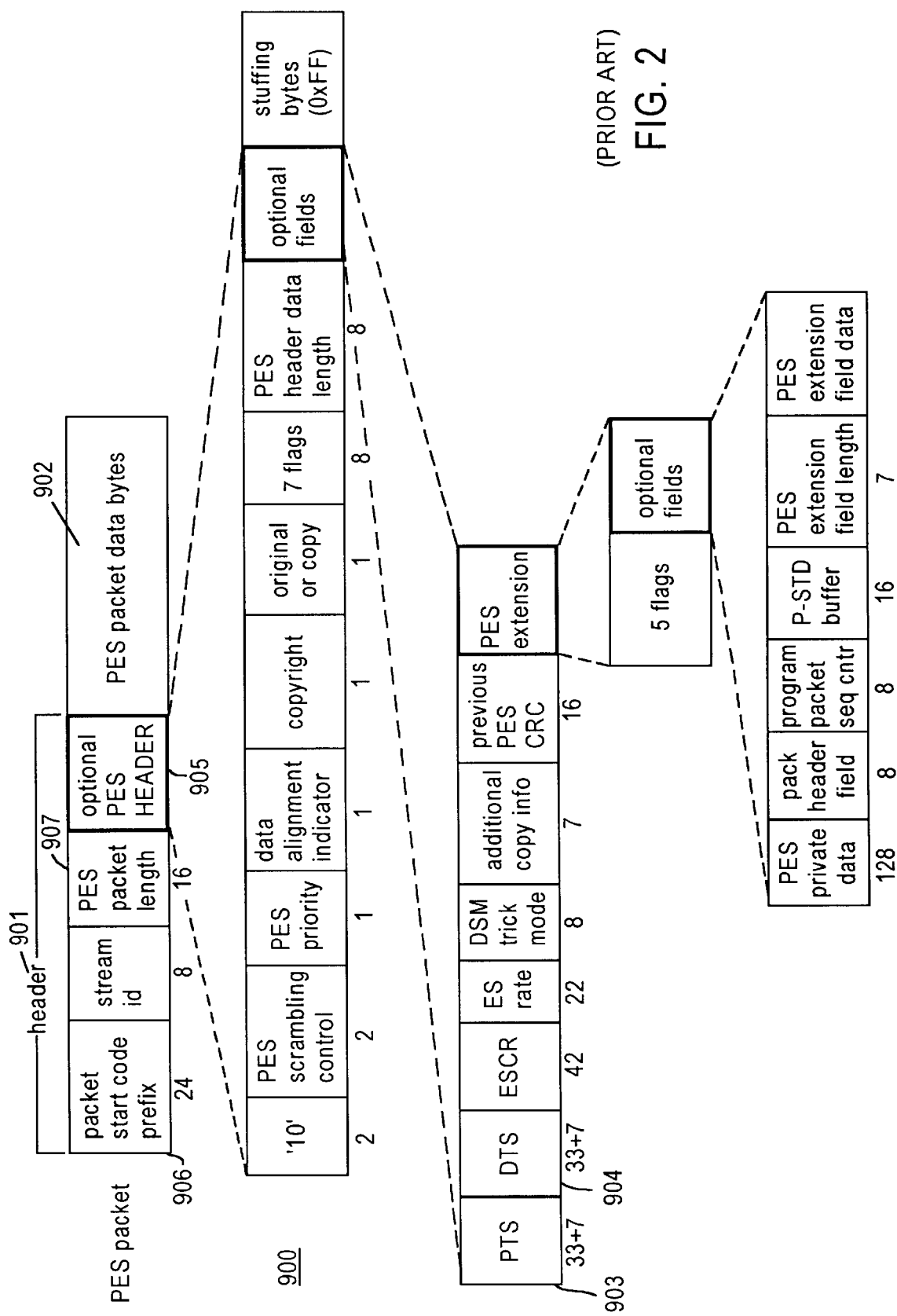
FIG. 2 is a diagram showing a structure of a PES packet 900 defined in the PMEG-2 standard.
Figure 3:
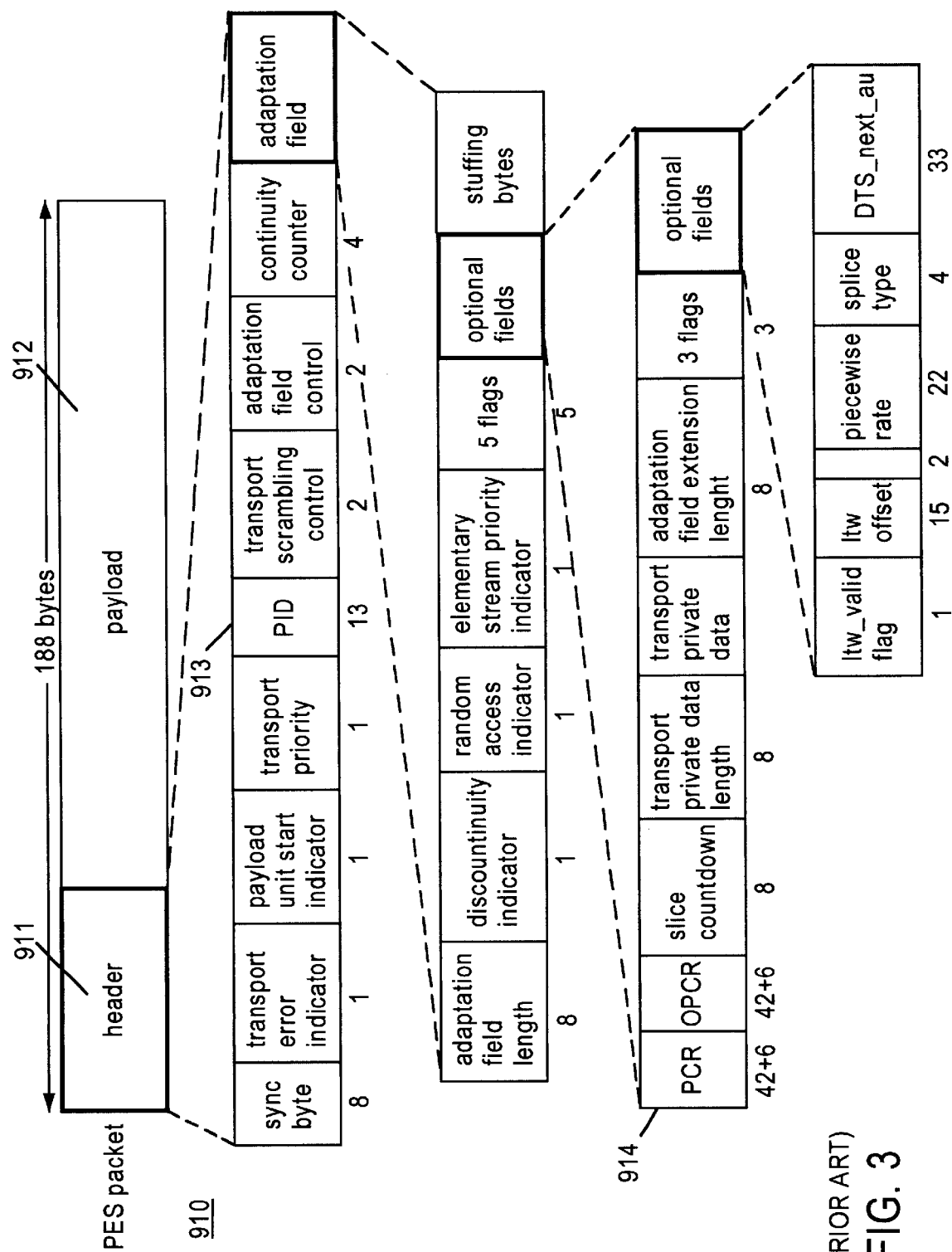
FIG. 3 is a diagram showing a structure of a TS packet 910 that results from the multiplexing of PES packet streams in accordance with the PMEG-2 standard.
Figure 4:
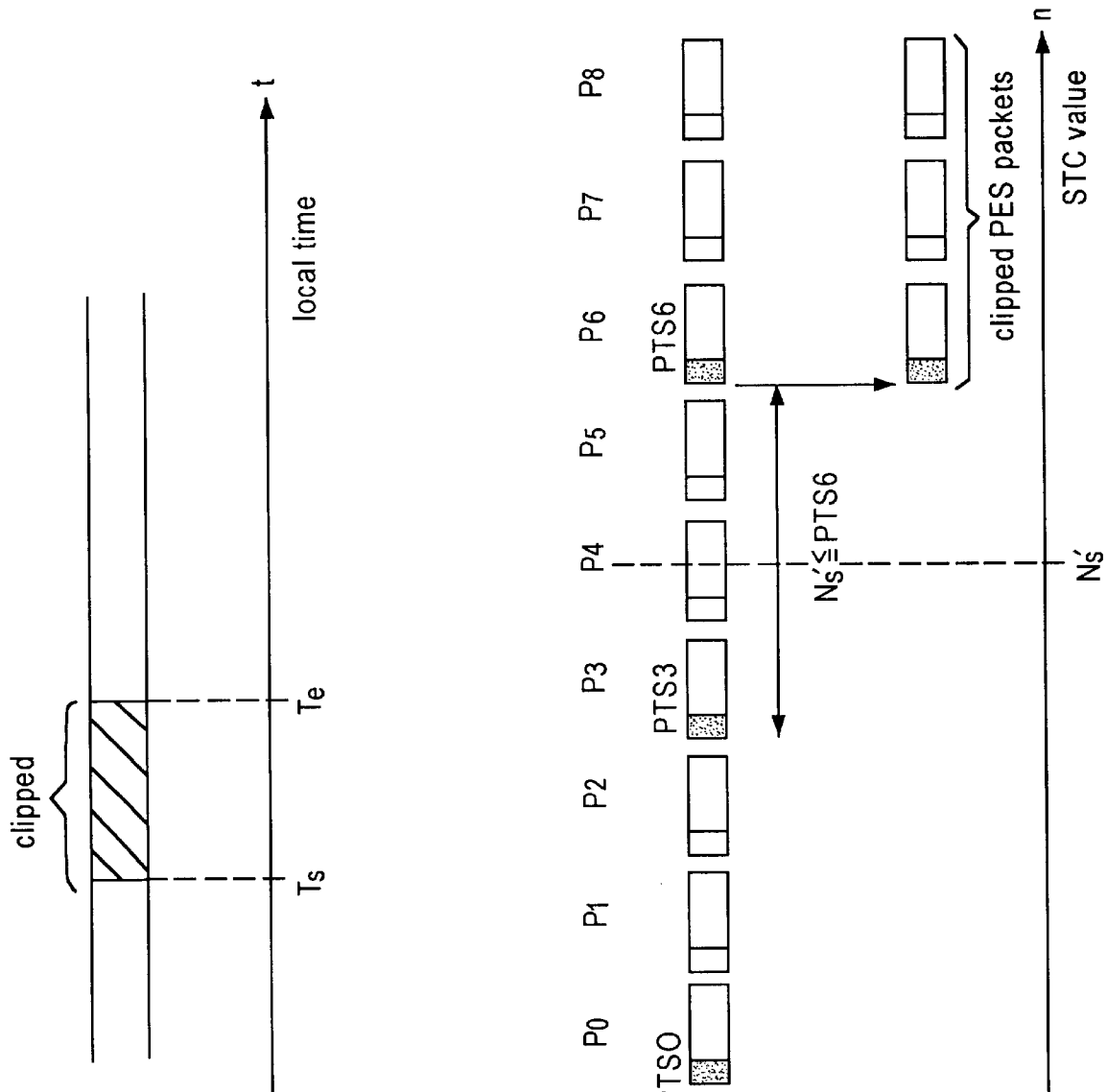
FIG. 4 is a diagram showing one conventional technique for clipping a desired portion of a received TS.

It is noted that the timing of the PES decoder 212 supplying the PES packets is not constant. In other words, the delay time from the front end of the terminal 4 to the PES decoder 212 varies packet by packet. This is due to buffering in the TS decoder 211 and the PES decoder 212 as well as to the PES packets being variable in length. Further, the broadcasting station 2 intentionally sets a certain delay between the transmission of continuous media in the PES and the transmission of STCs in the PCR fields so as to enable the receiving terminal 4 to secure an enough but least time to extract continuous media from a PRS packet and make ready for presentation. The range of this delay, which is determined from the point of system management, depends on the broadcasting station 2. Taking the above-mentioned delays into account, the values of the margins Tm1 and Tm2 are preferably set to ensure that the downloaded portion includes a desired portion. This enables the head of a PES packet preceding the desired portion to be detected by detecting the packet start code prefix 906 (FIG. 2).

The downloaded portion obtained by step 322 begins with the head of a PES packet. Instead of doing this, the download routine 316 may be configured to download the current PES packet before step 322. In this case, the downloaded portion begins with a halfway of the current PES packet.

Figure 5:
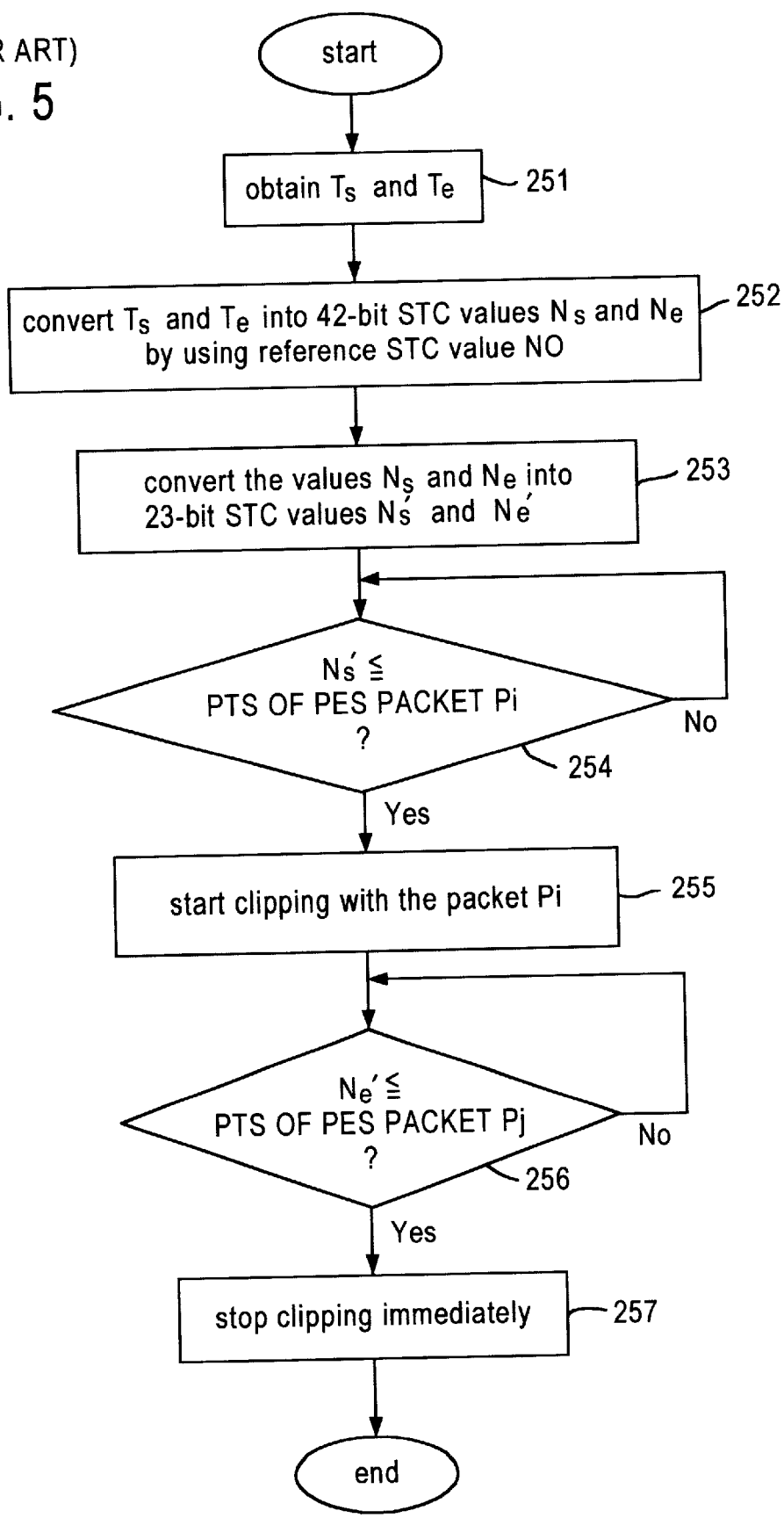
FIG. 5 is a flowchart showing an operation executed by the controller 215 in another downloading technique.

Thus downloaded media portions stored in the mass storage device 216 is trimmed into a precisely cut segment in the manner described in conjunction with FIGS. 5 and 6.

Figure 11:
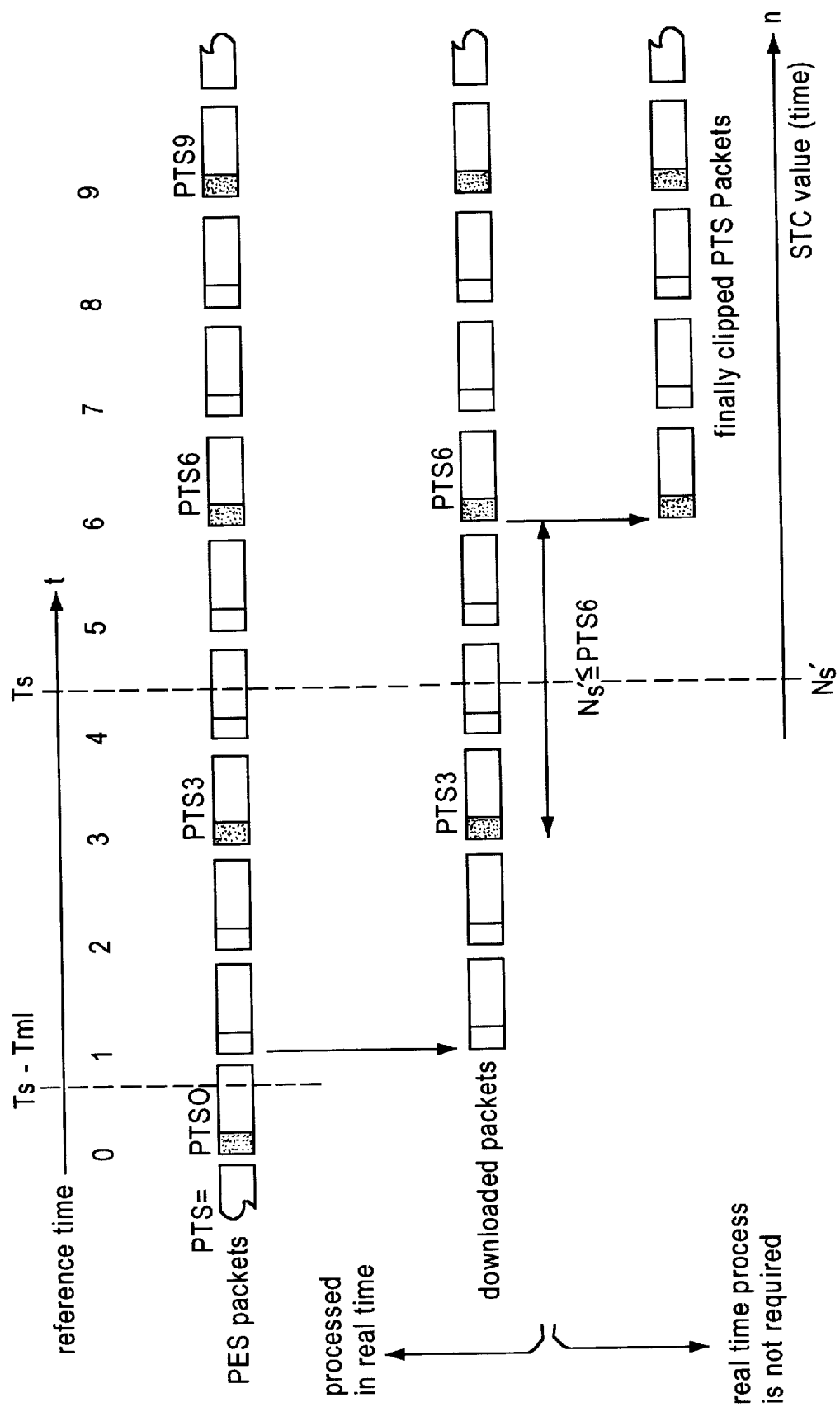
FIG. 11 is a diagram for describing an operation executed for the neighborhood of the beginning of a downloaded portion in the first illustrative embodiment of the invention.

FIG. 11 is a diagram for describing an operation executed for the neighborhood of the beginning of a downloaded portion in the first illustrative embodiment of the invention In FIG. 11, the rough downloading operation is executed in real time based on the reference time t as described above. However, once a larger media segment including the desired portion is stored in the storage device 216, a sufficient time can be speared for precise trimming of the stored segment.

According to the invention, a desired portion of a continuous media is clipped with a higher precision without any need of complicated hardware.

Downloading Based on the STC Value n

Figure 12:
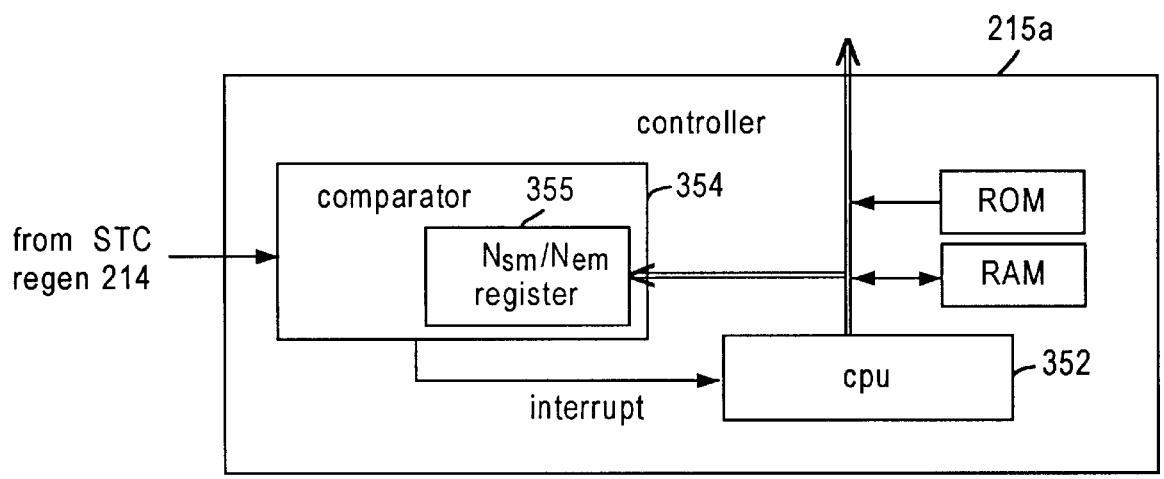
FIG. 12 is a schematic block diagram showing an exemplary arrangement of a controller 215a according to an illustrative embodiment of the invention.

Though the above-described rough downloading has been based on the reference time t, the first downloading may be based on the regenerated 42-bit STC value n. FIG. 12 is a schematic block diagram showing an exemplary arrangement of a controller 215a according to an illustrative embodiment of the invention. In FIG. 12, the controller 215a includes a CPU 352 and a comparator 354 having a 42-bit Tsm/Tem register 355. The comparator 354 compares the value of the register 355 with the STC value n from the STC regenerator 214. If the two values coincide with each other, the comparator 354 issues an interrupt to the CPU 352.

Figure 13:
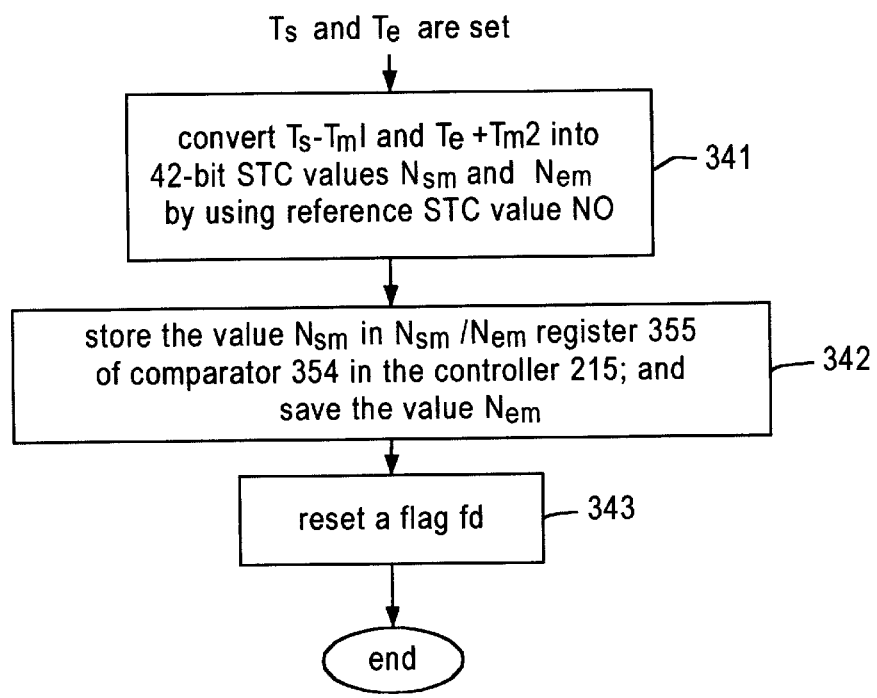
FIG. 13 is a flowchart showing an operation executed instead of steps 302 and 303 of FIG. 7.

FIG. 13 is a flowchart showing an operation executed instead of steps 302 and 303 of FIG. 7. If the controller 215 obtains start and end reference times Ts and Te for downloading in a conventional manner as described above, then, in step 341 the controller 215 converts the advanced start time Ts–Tm1 and the delayed end time Te+Tm2 into 42-bit STC values Nsm and Nem by using the reference STC value N0 from the TS decoder 211. In step 342, the controller 215 stores the start STC value Nsm in the NsmlNem register 355 of the comparator 354 in the controller 215a, and saves the end STC value. In step 343, the controller resets a flag fd and ends the operation to wait for an interrupt from the comparator 354.

Figure 14:
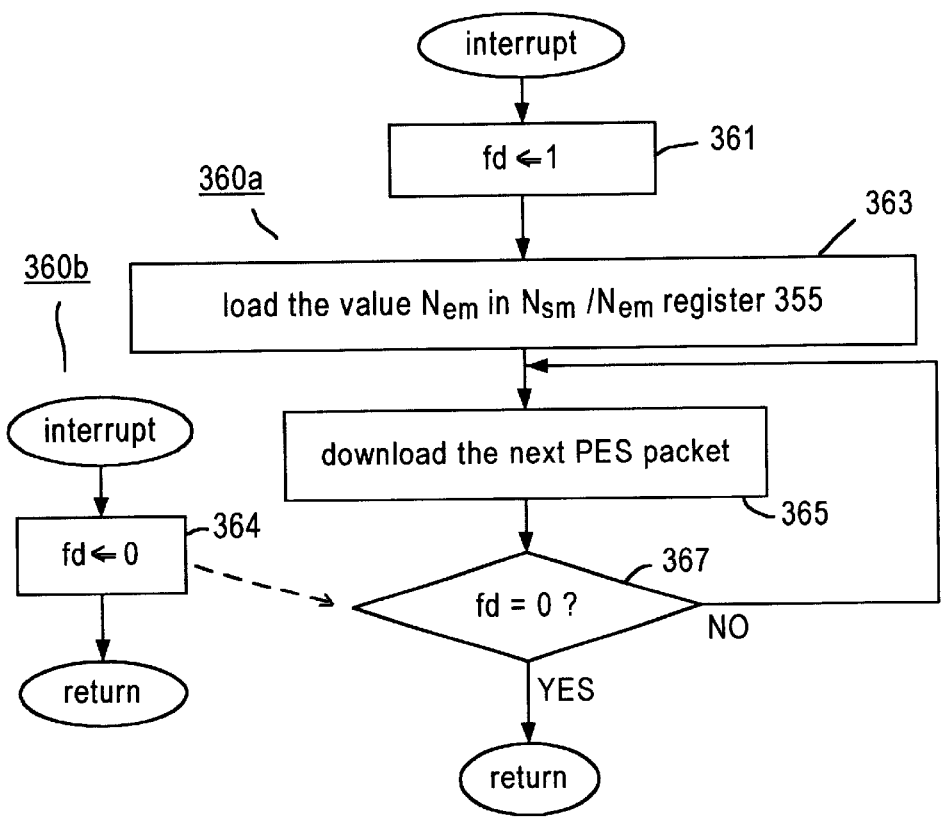
FIG. 14 shows flowcharts of subroutines 360a and 360b for downloading based on the STC value n.

FIG. 14 shows flowcharts of subroutines 360a and 360b for downloading based on the STC value n. In response to a first interrupt from the comparator 354, the subroutine 360a is called. In step 361, the flag fd is set to logical 1. In step 363, the value Nem is stored in the Nsm/Nem register 355. In step 365, the next PES packet is downloaded into the mass storage device 216. The step 365 is repeated till the flag fd is set to logical 0 in step 364 by the subroutine 360b caused by a second interrupt from the comparator 354, when the control is returned to the original routine. In this way, a rough downloading is achieved based on the STC Value n.

In this embodiment, the conversion of step 341 needs the reference STC value N0 which is transmitted from the broadcasting station. For this reason, the receiving terminal 4 is preferably provided with means described in connection with FIGS. 7 through 10 for the case when the terminal 4 can not receive the reference STC value N0.

Embodiment II

Figure 15:
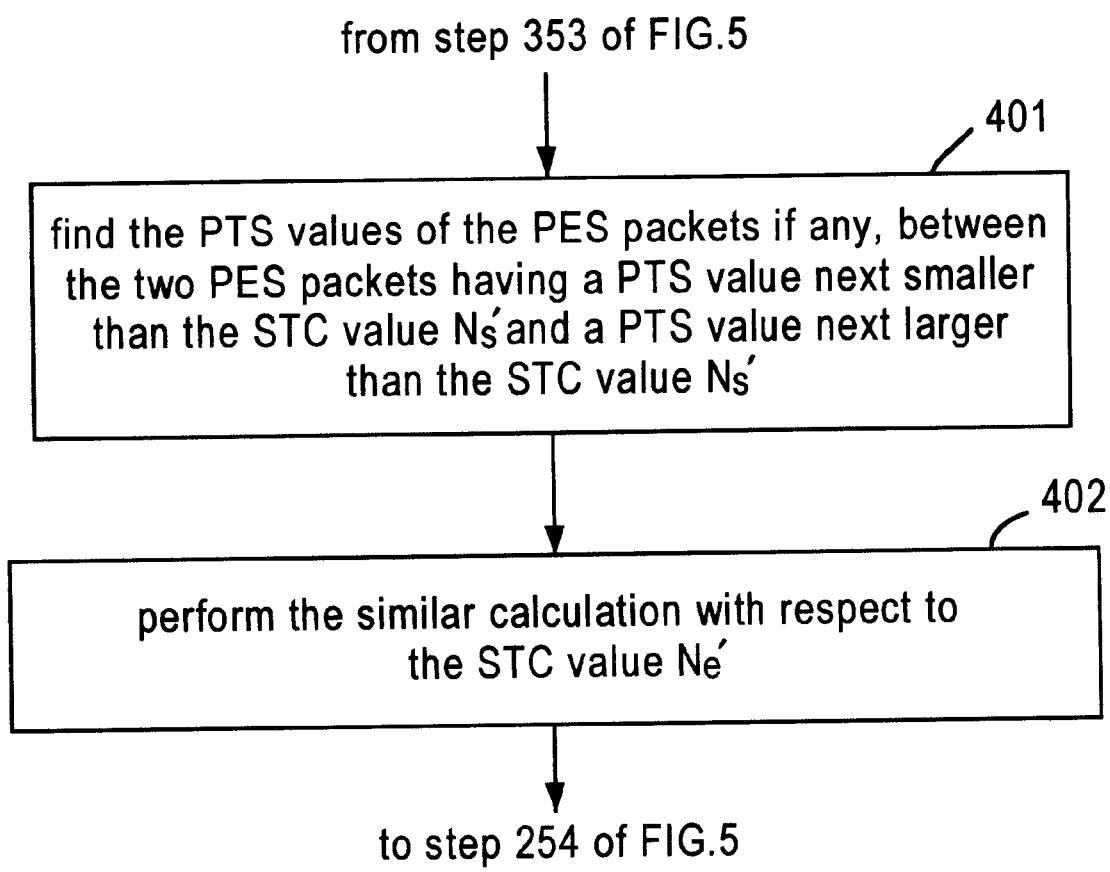
FIG. 15 is a part of a flowchart of precise trimming operation according to a second illustrative embodiment of the invention, which part, when inserted between the steps 253 and 254 of FIG. 5, makes FIG. 5 the flowchart.

Since all the PES packets do not necessarily have PTSs, the above-described precise trimming can trim the stored media segment only at the boundary of the PES packets with PTSs 903 in their headers 901. FIG. 15 is a part of a flowchart of precise trimming operation according to a second illustrative embodiment of the invention, which part, when inserted between the steps 253 and 254 of FIG. 5, makes FIG. 5 the flowchart. After step 253, the controller 215 calculates the PCT values of the PES packets between the two PES packets having a PTS value next smaller than the STC value Ns' and a PTS value next larger than the STC value Ns' in step 401. In step 402, the controller 215 calculates the PCT values of the PES packets between the two PES packets having a PTS value next smaller than the STC value Ne' and a PTS value next larger than the STC value Ne'.

Figure 16:
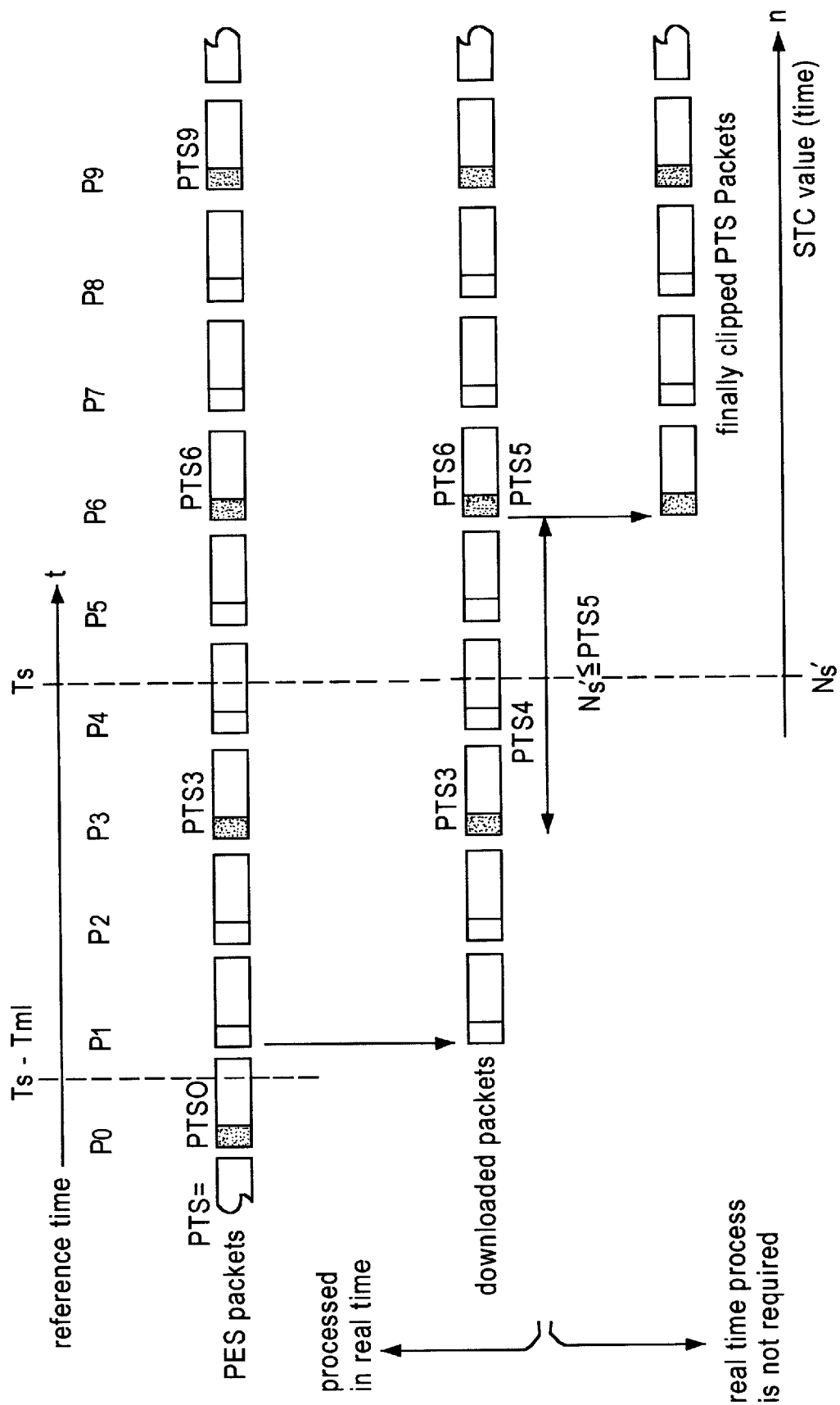
FIG. 16 is a diagram for describing an operation executed for the neighborhood of the beginning of a downloaded portion in the second illustrative embodiment of the invention.

FIG. 16 is a diagram for describing an operation executed for the neighborhood of the beginning of a downloaded portion in the second illustrative embodiment of the invention. In FIG. 16, the PTS values (PTS4 and PTS5) are calculated for the PES packets between the packets P3 and P6 through the step 401.

Then, in step 254, it is found that the PES packet PS has the smallest PTS value PTS5 that is larger than the start STC value Ns'. For this reason, the controller 215 starts downloading with the PES packet P5.

A technique for calculating a PTS value for a PES packet without a PTS value in step 401 and 402 is described here. The number of frames from the head of the PES packet having a PTS to the end of the packet just before the PES packet whose PTS is to be found. If the PTS of the packet PS, for example, is to be found, then the number of frames from the beginning of the packet P3 having PTS3 to the end of the packet P4. Assuming that the frames are transmitted at a constant rate, a time interval from the packet having PTS to the packet whose PTS is to be found is calculated by multiplying the number of frames by 1/30 second. If the number of the frames are 15, then the time interval for 15 frames is calculated by 15/30=0.5 sec (in reference time). Converting the calculated reference into a STC value yields a PTS.

The same operation is executed for the end portion of the stored media segment.

As described above, the second illustrative embodiment enables a PES packet-based precise trimming of a stored media portion.

Each of the calculated PTS values may be stored either in the PTS field created in the header of the corresponding PES packet or in other location than the PES packet. In the former case, a PES packet length 907 of the header 901 of the PES packet 900 has to be changed accordingly.

As is well known in the art, an PMEG-2 video stream comprises I pictures that can be decoded without using other picture's data, and P and B pictures that can not be decoded without other picture's data. The PMEG-2 video stream can be divided into groups of pictures such that each group includes one I picture and all the P and B pictures of the group can be decoded referring to the I and other pictures within the group. Such a group is hereinafter referred to as an I group.

It should be noted that the order of the frames supplied from the PES decoder 212 in an MPEG-2 system differs from that of the frames actually presented as is well known in the art. For this reason, the counting of frames has to be executed after arranging the frames in the presentation order. If the number of the frame in each PES packet is fixed and the I, P and B pictures appear regularly, the correct number of frames can be found by simply counting the frames to the PES packet in question and referring to a conversion table with the count value.

Alternatively, if each of the PES packets is configured to include only I groups, this facilitates precise trimming operation.

Embodiment III

Figure 17:
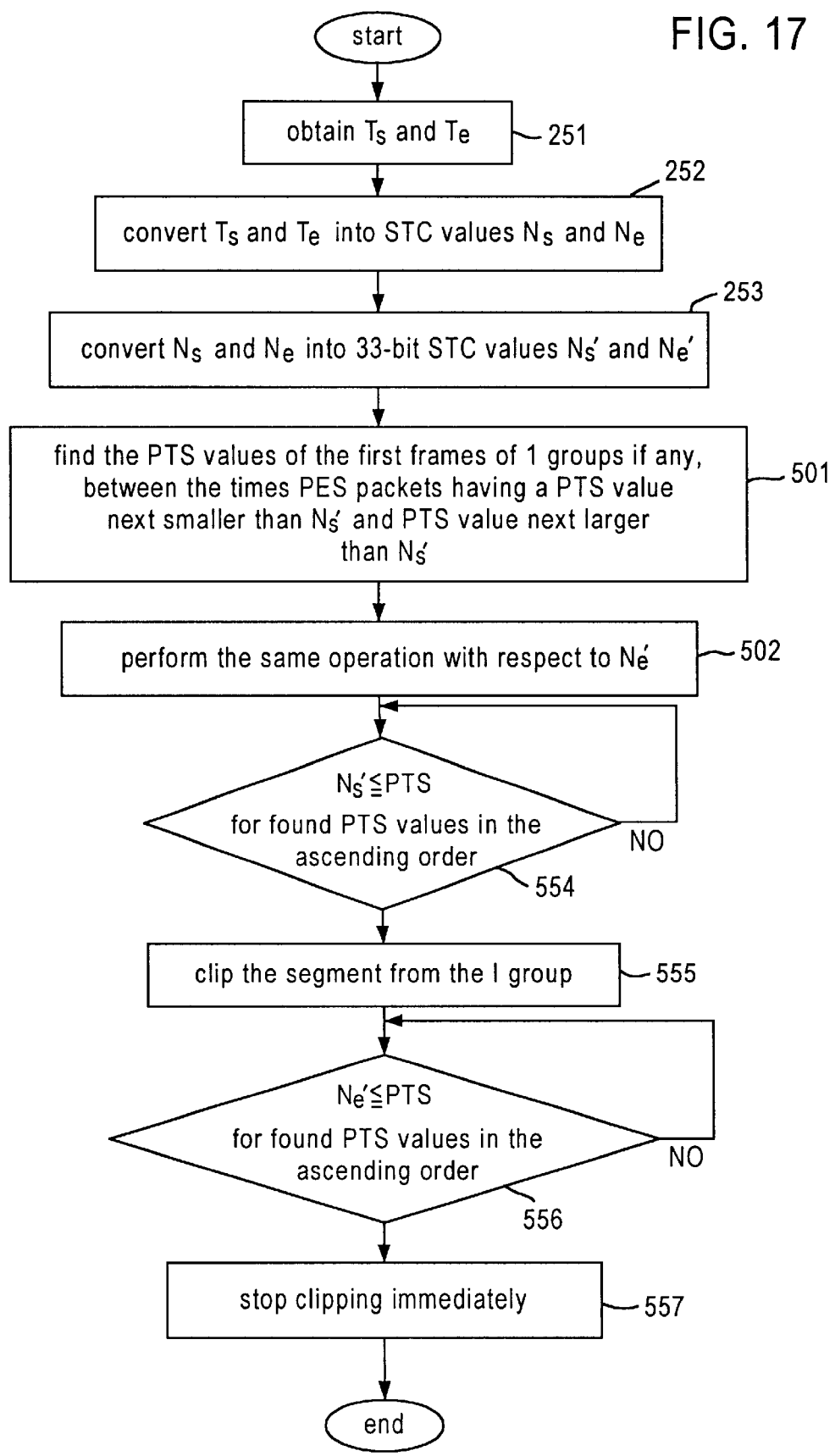
FIG. 17 is a flowchart showing an operation of precisely trimming a stored media segment by the unit of I group in accordance with an illustrative embodiment of the invention.

FIG. 17 is a flowchart showing an operation of precisely trimming a stored media segment by the unit of I group in accordance with an illustrative embodiment of the invention. Since FIG. 17 is similar to FIG. 5, only the difference will be described. In FIG. 17, after step 253, the controller 215 finds the PCT values of the first PES frames of I groups between the two PES packets having a PTS value next smaller than the STC value Ns' and a PTS value next larger than the STC value Ns' in step 501. In step 502, the controller 215 performs the same operation with respect to Ne'. In step 554, a test is made for the found PTS values in the ascending order to see if the PES value is equal to or larger than Ns'. If so, the controller 215 starts clipping with the GOP in step 555, and otherwise returns to step 554. In step 556, a test is made for the found PTS values in the ascending order to see if the PES value is equal to or larger than Ne'. If so, the controller 215 stops clipping immediately at step 557 and ends the operation. If the test result is NO in step 556, the controller 215 returns to step 556.

FIG. 18 a diagram for describing an operation executed for the neighborhood of the beginning of a downloaded portion in the third illustrative embodiment of the invention. In FIG. 18 it is assumed that each PES packet includes a plurality of I groups. The packet P4 includes four I groups. The PTS values of the first frame of the I groups in the packet P4 have been calculated as PTS4-1 through PTS4-4. Since the smallest PTS that exceeds Ns' is PTS4-3, a download is started with the I group having PTS4-3 in its first frame.

If the PES packets and the I groups are not aligned as shown in FIG. 18, adjustments such as the change of packet size is made for the first packet of the clipped (selected) portion. However, if the presentation decoder 213 is of such a type as accept I groups instead of PES format as the input, then there is no need of such an adjustment.

In the above descriptions, an identical downloading or trimming technique has been applied to both of the head and the end of a desired portion. However, it is noted that the above-described rough downloading techniques and precise trimming techniques may be freely applied in mixture to the head and the end of a desired portion.

Modifications

The above-described embodiments have used time stamps based on STC. However, time stamps by the reference time may be used instead of PTS or DTS. In this case, the broadcasting station 2 inserts a reference time-based time stamp in a PES header. The terminal 4 performs a precise trimming of the downloaded segment by comparing the start or end reference time Ts or Te with reference time-based time stamps of PES packets. The reference time in this case is preferably expressed in a unit not larger than 1/30 sec. FIG. 19 is a diagram showing an exemplary operation of obtaining a clip from a PES packet stream including reference time-based time stamp in accordance with the principles of the invention. In FIG. 19, PTS' and PTSi' indicate time stamps expressed in the reference time.

Though the above descriptions have been given in conjunction with figures showing the head of a media segment to be clipped, the descriptions are also true to the end of media segment.

If the terminal 4 has only a limited capacity of storage device that can not store the whole of the clipped segment, the storage device may be used as such a queue as operate in the first-in and first-out manner.

The clipped segment may be reduced in frame before storing in the storage device 216.

The above embodiments have used a standard time which does not depend on events as the reference time. However, a relative time measured from a specific event may be used as the reference time.

The above description has been made in conjunction with MPEG-2. However, the invention is applicable to any continuous media in any formats such as MPEG-1, MPEG-4, MPEG-2 AAC (Advanced Audio Coding), Dolby AC-3 (by Dolby Corporation), etc.

Though the above-described embodiments have used PTS, DTS may be used instead of PTS.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of clipping a specified segment with a raised precision from a continuous medium in a digital broadcasting system comprising a transmitter for transmitting a plurality of continuous media as a multiplexed stream and a plurality of layers of data units including a layer of packets, each packet including frames as data units of a lower layer, the method comprising the steps of:

optionally inserting an index in each header of selected packets of said packets at said transmitter, said index indicating a time to be decoded or presented;

causing a reference timer to generate a reference time (t) at each terminal;

obtaining a start time (Ts) and an end time (Te) of said segment at each terminal, said start time Ts and said end time Te being expressed in said reference time, downloading said continuous medium at each terminal during a period including said start time Ts and said end time Te to obtain a first portion of said continuous medium; and clipping a second portion from said first portion at each terminal such that said second portion starts with a data unit that has been received after said start time Ts and has a first header including a first minimum index and ends just before a data unit that has been received after said end time Te and has a second header including a second minimum index.

2. A method as defined in claim 1, wherein said step of downloading said continuous medium comprises the step of: downloading said first portion of said continuous medium during a period from an advanced start time Ts−Tm1 to a delayed end time Te+Tm2, where Tm1 and Tm2 are margins of an order of seconds.

3. A method as defined in claim 1, further including the step of each terminal calibrating said reference timer by using information transmitted from said transmitter, and wherein said downloading step uses said reference time.

4. A method as defined in claim 1, further including the steps of:
said transmitter,
generating a second reference time from a standard time; and
expressing said indexes in said second reference time, and wherein said clipping step comprises the step of clipping said second portion such that said second portion starts with a packet with a first header including a first earliest index later than said start time Ts and ends just before a packet with a second header including a second earliest index later than said end time Te.

5. A method as defined in claim 4, further including the step of each terminal calibrating said reference timer by using information transmitted from said transmitter.

6. A method as defined in claim 5, wherein the step of each terminal calibrating said reference timer includes the steps of:
generating a counter value (n) in accordance with count values synchronously inserted in said multiplexed stream;
obtaining a reference count value for use in conversion between said counter value n and said reference time t;
calibrating said reference timer by using said counter value n and said reference count value.

7. A method as defined in claim 1, further including the steps of:
said transmitter,
generating first counter values;
synchronously inserting said first counter values in said multiplexed stream; and
using said first counter values for said indexes, and wherein said clipping step comprises the steps of:
generating a second counter value (n) in accordance with said first counter values extracted from said multiplexed stream;
obtaining from said multiplexed stream a reference counter value for use in conversion between said second counter value n and said reference time t;
converting said start time Ts and said end time Te into a start counter value (Ns) and an end counter value (Ne) expressed in a same unit as said second counter value n by using said reference counter value; and
clipping said second portion such that said second portion starts with a first packet with a first header including a first minimum index larger than said start counter value Ns and ends just before a second packet with a second header including a second minimum index larger than said end counter value.

8. A method as defined in claim 7, wherein said downloading step includes the step of
downloading said continuous medium during a period including said start counter value (Ns) and said end counter value (Ne) referring to said reference time.

9. A method as defined in claim 1, further including the steps of:
said transmitter,
generating first counter values;
synchronously inserting said first counter values in said multiplexed stream; and
using, for each of said indexes, a precision-reduced version of one of said first counter values, and wherein said clipping step comprises the steps of:
generating a second counter value (n) in accordance with said first counter values extracted from said multiplexed stream;
obtaining from said multiplexed stream a reference counter value for use in conversion between said second counter value n and said reference time t;
converting said start time Ts and said end time Te into a start counter value (Ns) and an end counter value (Ne) expressed in a same unit as said second counter value n by using said reference counter value;
converting said start counter value Ns and said end counter value Ne into a start value (Ns') and an end value (Ne') of a same precision as said indexes; and
clipping said second portion such that said second portion starts with a first packet with a first header including a first minimum index larger than said start value Ns' and ends just before a second packet with a second header including a second minimum index larger than said end value Ne'.

10. A method as defined in claim 9, further including the steps of:
said transmitter conforming said multiplexed stream to a TS (Transport Stream) defined in the MPEG-2 (Moving Picture Experts Group) standard by inserting said first counter values in CPR (Program Clock Reference) fields and by using said indexes for PTS (Presentation Time Stamp) fields and DTS (Decoding Time Stamp) fields of said headers of said packets to make said packets PES (Packetized Elementary Stream) packets; and
said terminal utilizing one of said PTS and DTS as said indexes.

11. A method as defined in claim 10, further including the steps, executed prior to said clipping step by said terminal, of:
if at least one first PES packet without an index value exists between two PES packets having a PTS value next smaller than said start value Ns' and a PTS value next larger than said start value Ns', finding a PTS value of each first PES packets through frame counting on the assumption of constant intervals between adjacent frames;

if at least one second PES packet without an index value exists between two PES packets having a PTS value next smaller than said end value Ne' and a PTS value next larger than said end value Ne', finding a PTS value of each second PES packet; and applying said clipping step to said at least one PES packet for which said PTS value has been found.

12. A method as defined in claim 11, wherein said making said packets PES packets includes the step of configuring each of said packets to consist of at least one I group, each I group including only one I picture and P and B pictures such that all of said P and B pictures can be decoded without referring to a picture of any other groups.

13. A method as defined in claim 10, further including the steps, executed prior to said clipping step by said terminal, of:

if at least one first I group exists between two PES packets having a PTS value next smaller than said start value Ns' and a PTS value next larger than said start value Ns', finding a PTS value of a first frame of each first I group through frame counting on the assumption of constant intervals between adjacent frames, each I group including only one I picture and P and B pictures such that all of said P and B pictures can be decoded without referring to a picture of any other groups;

if at least one second I group exists between two PES packets having a PTS value next smaller than said end value Ne' and a PTS value next larger than said end value Ne', finding a PTS value of a first frame of each second I group; and applying said clipping step to said at least one I group for which said PTS value has been found.

14. A method as defined in claim 1, further including the steps, executed prior to said clipping step by said terminal, of:

if at least one first packet without an index value exists between two packets having an index next smaller than said start time Ts and an index next larger than said start time Ts, finding an index value of each first packet through frame counting on the assumption of constant intervals between adjacent frames;

if at least one second packet without an index value exists between two packets having an index next smaller than said end time Te and an index next larger than said end time Te, finding an index value of each second packet through frame counting; and applying said clipping step to said at least one packet for which said index value has been found.

15. A method as defined in claim 1, further including the steps of:

said transmitter conforming said multiplexed stream to a TS (Transport Stream) defined in the MPEG-2 (Moving Picture Experts Group) standard by using said indexes for PTS (Presentation Time Stamp) fields and DTS (Decoding Time Stamp) fields of said headers of said packets to make said packets PES (Packetized Elementary Stream) packets; and said terminal utilizing one of said PTPS and DTS as said indexes.

16. A method as defined in claim 15, wherein said making said packets PES packets includes the step of configuring each of said packets to consist of at least one I group, each I group including only one I picture and P and B pictures such that all of said P and B pictures can be decoded without referring to a picture of any other groups.

17. A method as defined in claim 1, further including the steps of:

said transmitter conforming said multiplexed stream to a system stream defined in the MPEG-1 (Moving Picture Experts Group I) standard by using said indexes for PTS (Presentation Time Stamp) fields and DTS (Decoding Time Stamp) fields of said headers of said packets; and said terminal utilizing one of said PTS and DTS as said indexes.

18. A system capable of not only utilizing a plurality of continuous media transmitted as a multiplexed stream from a digital broadcasting station but also clipping a specified segment from any of the continuous media with a raised precision, wherein each continuous medium is structured to form a plurality of layers of data units including a layer of packets, each packet including frames as data units of a lower layer and wherein an index is inserted in each header of selected packets of said packets, the system comprising:

a reference timer for generating a reference time (t);

means for obtaining a start time (Ts) and an end time (Te) of said segment, said start time Ts and said end time Te being expressed in said reference time, means for downloading said continuous medium during a period including said start time Ts and said end time Te to obtain a first portion of said continuous medium; and means for clipping a second portion from said first portion such that said second portion starts with a data unit that has been received after said start time Ts and has a first header including a first minimum index and ends just before a data unit that has been received after said end time Te and has a second header including a second minimum index.

19. A system as defined in claim 18, wherein said means for downloading said continuous medium comprises means for downloading said first portion of said continuous medium during a period from an advanced start time Ts−Tm1 to a delayed end time Te+Tm2, where Tm1 and Tm2 are margins of an order of seconds.

20. A system as defined in claim 18, further including means for calibrating said reference timer by using information transmitted from the broadcasting system, and wherein said downloading means uses said reference time.

21. A system as defined in claim 18, wherein the broadcasting system generates a second reference time from a standard time to express said indexes in said second reference time, and wherein said clipping means comprises means for clipping said second portion such that said second portion starts with a packet with a first header including a first earliest index later than said start time Ts and ends just before a packet with a second header including a second earliest index later than said end time Te.

22. A system as defined in claim 21, further including means for calibrating said reference timer by using information transmitted from the broadcasting system.

23. A system as defined in claim 22, wherein means for calibrating said reference timer includes:

means for generating a counter value (n) in accordance with count values synchronously inserted in said multiplexed stream;

means for obtaining a reference count value for use in conversion between said counter value n and said reference time t;

means for calibrating said reference timer by using said counter value n and said reference count value.

24. A system as defined in claim 8, wherein first counter values are synchronously inserted in said multiplexed stream and said first counter values are also used for said indexes and wherein said clipping means comprises:

means for generating a second counter value (n) in accordance with said first counter values extracted from said multiplexed stream;

means for obtaining from said multiplexed stream a reference counter value for use in conversion between said second counter value n and said reference time t;

means for converting said start time Ts and said end time Te into a start counter value (Ns) and an end counter value (Ne) expressed in a same unit as said second counter value n by using said reference counter value; and means for clipping said second portion such that said second portion starts with a first packet with a first header including a first minimum index larger than said start counter value Ns and ends just before a second packet with a second header including a second minimum index larger than said end counter value.

25. A system as defined in claim 24, wherein said downloading means includes means for downloading said continuous medium during a period including said start counter value (Ns) and said end counter value (Ne) referring to said reference time.

26. A system as defined in claim 18, wherein first counter values are synchronously inserted in said multiplexed stream and a precision-reduced version of one of said first counter values is used for each of said indexes, and wherein said clipping means comprises:

means for generating a second counter value (n) in accordance with said first counter values extracted from said multiplexed stream;

means for obtaining from said multiplexed stream a reference counter value for use in conversion between said second counter value n and said reference time t;

means for converting said start time Ts and said end time Te into a start counter value (Ns) and an end counter value (Ne) expressed in a same unit as said second counter value n by using said reference counter value;

means for converting said start counter value Ns and said end counter value Ne into a start value (Ns') and an end value (Ne') of a same precision as said indexes; and means for clipping said second portion such that said second portion starts with a first packet with a first header including a first minimum index larger than said start value Ns' and ends just before a second packet with a second header including a second minimum index larger than said end value Ne'.

27. A system as defined in claim 26, wherein said multiplexed stream is conformed to a TS (Transport Stream) defined in the MPEG-2 (Moving Picture Experts Group) standard by inserting said first counter values in CPR (Program Clock Reference) fields and by using said indexes for PTS (Presentation Time Stamp) fields and DTS (Decoding Time Stamp) fields of said headers of said packets to make said packets PES (Packetized Elementary Stream) packets, and wherein said system utilizes one of said PTS and DTS as said indexes.

28. A system as defined in claim 27, further including:

means, activated in the event at least one first PES packet without an index value exists between two PES packets having a PTS value next smaller than said start value Ns' and a PTS value next larger than said start value Ns', for finding a PTS value of each first PES packets through frame counting on the assumption of constant intervals between adjacent frames;

means, activated in the event at least one second PES packet without an index value exists between two PES packets having a PTS value next smaller than said end value Ne' and a PTS value next larger than said end value Ne', for finding a PTS value of each second PES packet; and means for controlling said clipping means to operate on said at least one PES packet for which said PTS value has been found.

29. A system as defined in claim 28, wherein each of said packets consists of at least one I group, each I group including only one I picture and P and B pictures such that all of said P and B pictures can be decoded without referring to a picture of any other groups.

30. A system as defined in claim 27, further including:

means, activated in the event at least one first I group exists between two PES packets having a PTS value next smaller than said start value Ns' and a PTS value next larger than said start value Ns', for finding a PTS value of a first frame of each first I group through frame counting on the assumption of constant intervals between adjacent frames, wherein each I group includes only one I picture and P and B pictures such that all of said P and B pictures can be decoded without referring to a picture of any other groups;

means, activated in the event at least one second I group exists between two PES packets having a PTS value next smaller than said end value Ne' and a PTS value next larger than said end value Ne', for finding a PTS value of a first frame of each second I group; and means for controlling said clipping means to operate on said at least one I group for which said PTS value has been found.

31. A system as defined in claim 18, further including:

means, activated in the event at least one first packet without an index value exists between two packets having an index next smaller than said start time Ts and an index next larger than said start time Ts, for finding an index value of each first packet through frame counting on the assumption of constant intervals between adjacent frames;

means, activated in the event at least one second packet without an index value exists between two packets having an index next smaller than said end time Te and an index next larger than said end time Te, for finding an index value of each second packet through frame counting; and means for controlling said clipping means to operate on said at least one packet for which said index value has been found.

32. A system as defined in claim 18, wherein said multiplexed stream is conformed to a TS (Transport Stream) defined in the MPEG-2 (Moving Picture Experts Group) standard by using said indexes for PTS (Presentation Time Stamp) fields and DTS (Decoding Time Stamp) fields of said headers of said packets to make said packets PES (Packetized Elementary Stream) packets, and wherein said system utilizes one of said PTS and DTS as said indexes.

33. A system as defined in claim 32, wherein each of said packets consists of at least one I group, each I group including only one I picture and P and B pictures such that all of said P and B pictures can be decoded without referring to a picture of any other groups.

34. A system as defined in claim 18, wherein said multiplexed stream is conformed to a system stream defined in the MPEG-1 (Moving Picture Experts Group I) standard by using said indexes for PTS (Presentation Time Stamp) fields and DTS (Decoding Time Stamp) fields of said headers of said packets, and wherein said system utilizes one of said PTS and DTS as said indexes.

* * * * *